United States Patent [19]

Hofinger et al.

[11] Patent Number: 4,730,079
[45] Date of Patent: Mar. 8, 1988

[54] QUATERNARY OXALKYLATED POLYCONDENSATES

[75] Inventors: Manfred Hofinger; Willibald Böse, both of Burgkirchen; Martin Hille, Liederbach; Roland Böhm, Kelkheim, all of Fed. Rep. of Germany

[73] Assignee: Hoechst Aktiengesellschaft, Frankfurt am Main, Fed. Rep. of Germany

[21] Appl. No.: 889,334

[22] Filed: Jul. 23, 1986

[30] Foreign Application Priority Data

Jul. 25, 1985 [DE] Fed. Rep. of Germany ....... 3526600

[51] Int. Cl.$^4$ .................. C07C 69/34; C07C 69/80
[52] U.S. Cl. .................. 560/196; 252/8.555; 252/356; 252/357; 560/88
[58] Field of Search .................. 560/88, 196

[56] References Cited

U.S. PATENT DOCUMENTS

| 3,816,378 | 6/1974 | Schmadel | 560/196 X |
| 4,026,941 | 5/1977 | Login et al. | 560/196 X |
| 4,606,916 | 8/1986 | Hofinger et al. | 560/196 X |

FOREIGN PATENT DOCUMENTS

| 2238995 | 7/1978 | Fed. Rep. of Germany . |
| 3136298 | 3/1983 | Fed. Rep. of Germany . |

Primary Examiner—Werren B. Lone
Assistant Examiner—Vera C. Clarke

[57] ABSTRACT

Quaternary oxalkylated polycondensates are described; these are prepared by esterifying, with polycondensation, an oxalkylated primary fatty amine with a diol and with a dicarboxylic acid, and oxalkylating the resulting reaction product in the presence of a carboxylic acid. These polycondensates are used as demulsifiers for breaking crude oil emulsion and as corrosion inhibitors in plants for the recovery and treatment of natural gas and crude oil.

7 Claims, No Drawings

QUATERNARY OXALKYLATED POLYCONDENSATES

The invention relates to quaternary oxalkylated polycondensates, to a process for their preparation and to their use as corrosion inhibitors and demulsifiers for crude oil emulsions.

In the extraction of crude oil, the corrosion of extraction equipment, pipelines and treatment plants constitutes a problem which continues to increase over the period of time in which a crude oil field is exploited. Whereas pure crude oil is almost exclusively recovered from a newly developed crude oil field in the initial phase, the water content of the crude oil increases after a certain time. The crude oil contains constituents having a corrosive action, such as electrolytes, hydrogen sulfide and carbon dioxide. However, whereas the pure crude oil extracted in the initial phase scarcely results in corrosion problems, these problems increase considerably as the water content increases. Prior to being transported further by means of pipelines, tank wagons or ships, it is necessary substantially to remove from the crude oil the water which is distributed in the latter in the form of an emulsion. So-called demulsifiers or emulsion breakers are added to the aqueous crude oil for this purpose. Although these substances do not themselves have a corrosive action, they promote wetting with water in the installation and thus promote corrosion indirectly.

Attempts have already been made to eliminate this disadvantage by adding suitable corrosion inhibitors. In addition to the factor of expense caused by the use of such inhibitors, most of these products have the disadvantage that they themselves have an emulsifying action or a stabilizing action on emulsions, which can only be compensated for by increasing the amount of emulsion breaker required for the optimum removal of the water. Cationic compounds which, in addition to their action as corrosion inhibitors, at the same time also have good demulsifying properties have already been employed. Compounds of this type are disclosed, for example, in German Auslegeschrift 2,238,995 or in German Offenlegungsschrift 3,136,298. In some cases they exhibit a good demulsifying action, but they do not achieve the action of highly effective nonionic demulsifiers. On their own, they have not been able to gain acceptance on a large scale. It is only in some oilfields that combinations with nonionic demulsifiers have led to good results in the demulsification of crude oil and the inhibition of corrosion, because in these cases synergistic effects occurred in the demulsification. There is, however, still a need for demulsifiers which themselves have a corrosion-inhibiting effect.

The present invention provides improved agents for the purpose mentioned. These are quaternary oxyalkylated polycondensates of the general formula

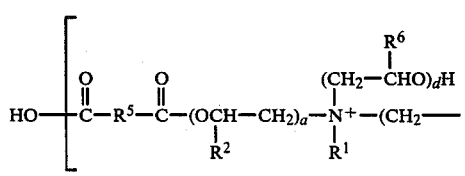
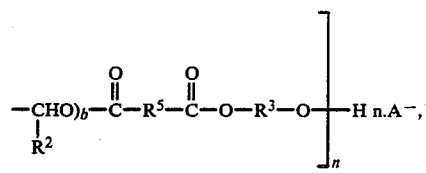

(I)

in which
- $R^1$ is an alkyl radical or alkenyl radical having 8 to 23 carbon atoms,
- $R^2$ is H or $CH_3$ and, arranged in blocks within the chain of the polyoxalkylene radical, can also assume both meanings,
- $R^3$ denotes an alkylene radical of formula $-(CH_2)_x-$ in which x is an integer from 1 to 6 or denotes a polyoxalkylene radical of the formula

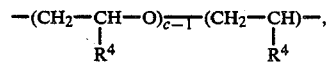

in which $R^4$ is H or $CH_3$ and, arranged statistically or in blocks within the chain, can also assume both meanings, and c is an integer or fractional number from 2 to 80,
- $R^5$ is an alkylene radical of the formula $-(CH_2)_y-$ in which y denotes an integer from 1 to 8, it being possible for this alkylene radical optionally to carry 1 to 2 OH groups, or $R^5$ is a vinylene radical or a p-phenylene radical,
- $R^6$ is H or $CH_3$,
- $A^-$ denotes the anion of a carboxylic acid having 2 to 6 carbon atoms or of a hydroxycarboxylic acid having 2 to 6 carbon atoms and 1 to 3 OH groups or denotes the anion of benzoic acid, salicylic acid or phosphoric acid,
- a and b are identical or different and are an integer or fractional number from 1 to 15,
- d is an integer or fractional number from 1 to 2 and
- n is an integer which can assume values from 2 to 50

In preferred embodiments of the invention, the definitions in the formula I assume the following meaning: $R^1$ is an alkyl radical having 12 to 18 carbon atoms; $R^2$ is H and a and b are identical or different and are integers or fractional numbers from 1 to 8; $R^3$ is the radical of a block copolymer composed of at least one block of ethylene oxide units, the total number of ethylene oxide units being an integer or fractional number from 15 to 35, the total number of propylene oxide units being an integer or fractional number from 20 to 40 and the sum of the two being not more than 60; $R^5$ is an alkylene radical of the formula $-(CH_2)_y-$ in which y denotes an integer from 1 to 8; $R^6$ is H; and n is an integer which can assume values from 2 to 20. The numbers a, b, c and d represent average values.

The compounds of the formula I are prepared by esterifying, with polycondensation, an oxalkylated primary fatty amine of the formula

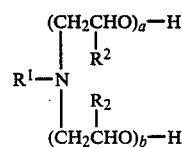

in which $R^1$, $R^2$, a and b have the meaning indicated in formula I and a diol compound of the formula HO—$R^3$OH (III) in which $R^3$ has the meaning indicated in formula I, with a dicarboxylic acid of the formula $$\text{HOOC}-R^5-\text{COOH} \qquad (IV)$$

in which $R^5$ has the meaning indicated in formula I, the molar ratio of oxalkylated primary fatty amine to diol compound being 1:3 to 3:1 and the molar ratio of the Sum of the oxalkylated primary fatty amine plus the diol compound to the dicarboxylic acid being 0.8:1 to 1:0.8, and then reacting the resulting reaction product with ethylene oxide or propylene oxide in the presence of a carboxylic acid having 2 to 6 carbon atoms, a hydroxycarboxylic acid having 2 to 6 carbon atoms and 1 to 3 OH groups, benzoic acid, salicylic acid or phosphoric acid.

It is preferable to employ the oxalkylated primary fatty amine and the diol compound in a molar ratio of 1:1 to 3:1. The molar ratio of the sum of the moles of oxalkylated primary fatty amine plus diol compound to the number of moles of dicarboxylic acid is preferably 1:0.8 to 1:0.95.

The oxalkylated primary fatty amines used as the starting compounds of formula II are obtained by known processes for oxalkylating primary fatty amines. A review of methods for the preparation of this well-known class of compounds is given in Schöfeldt, "Surface Active Ethylene Oxide Adducts", Wissenschaftliche Verlagsgesellschaft, Stuttgart, 1976, pages 70 to 73. The oxyalkylated products can carry units of propylene oxide, but preferably units of ethylene oxide or chains composed of both units, the two different units being arranged in blocks in the latter case.

Preferred primary amines which can be oxalkylated to give starting compounds of the formula II are the industrially available products stearylamine or coconut oil amine. However, it is equally possible, in accordance with the invention, to use other monoamines having an alkyl chain distribution of varying widths or amines having a uniform chain. It is also possible to employ, on their own or as a mixture, fatty amines which the chains contain one or more double bonds, such as, for example, the radicals of oleic, elaidic, linoleic or linolenic acid.

Oxalkylated fatty amines of this type constitute a nitrogen-containing, esterifiable diol component.

Employed therewith is a further diol compound which contains no nitrogen. This diol of the formula HO—$R^3$—OH in which $R^3$ denotes an alkylene radical of the formula —$(CH_2)_x$— and in which x is an integer from 1 to 6 is represented, for example, by butane-1,4-diol or hexane-1,6-diol, by polyethylene glycols or polypropylene glycols or by copolymers of ethylene oxide and propylene oxide, i.e. $R^3$ is a radical of the formula

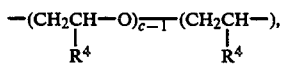

in which $R^4$ is H or $CH_3$ and c is an integer or fractional number from 2 to 80. Accordingly, $R^4$ can also assume the meaning of H and $CH_3$ within the chain, i.e. the radical $R^3$ contains ethylene oxide units and propylene oxide units. These can be arranged statistically. Preferably, however, the radicals are those of block polymers composed of at least one block of ethylene oxide units and at least one block of propylene oxide units, the total number of ethylene oxide units being an integer or fractional number from 15 to 35, the total number of propylene oxide units being an integer or fractional number from 20 to 40 and the sum of the two being not more than 60.

Block polymers which are particularly preferred are those in which ethylene oxide blocks are attached to both sides of a propylene oxide block, the total numbers of units indicated above being applicable to these block polymers. Both of the diol components—of the formula II and of the formula III—are esterified with a dicarboxylic acid of the formula IV.

Dicarboxylic acids suitable for the esterification are aliphatic dicarboxylic acids containing $C_1$- to $C_8$-alkylene groups, such as malonic acid, succinic acid, glutaric acid, adipic acid or sebacic acid, or aliphatic dicarboxylic acids which are substituted by 1 to 2 OH groups, such as malic acid, tartronic acid or tartaric acid, and also fumaric acid or maleic acid. Aliphatic dicarboxylic acids having 4 to 8 carbon atoms in the alkylene radical, that is to say the homologous series from adipic acid up to sebacic acid, are particularly suitable. It is also possible to employ derivatives of such dicarboxylic acids, in particular the esters and acid halides thereof, in the esterification reaction.

The esterification of the compounds of the formula II and III, which takes place with polycondensation, is carried out by known methods using a dicarboxylic acid of the formula IV in relatively high-boiling inert solvents, such as toluene or xylene, or, preferably, without a solvent in the melt and with blanketing with a protective gas. In the case of esterification in a solvent, it is expedient to select, as the reaction temperature, the reflux temperature of the reaction mixture and to remove by azeotropic distillation the water formed in the reaction. In the case of esterification without a diluent, the water of reaction is distilled off directly from the reaction mixture. The reaction temperatures involved are 140° to 220° C., preferably 150° to 180° C. An acid catalyst, such as, for example, p-toluenesulfonic acid or hypophosphorus acid, is used in order to accelerate the reaction. The completeness of the reaction is monitored by determining the amine number and the acid number.

The analytical determination of the average degree of polycondensation of the resulting product and hence the average molecular weight can be carried out by chromatography by means of HPLC or HPSEC.

The quaternization reaction is carried out with ethylene oxide or propylene oxide, preferably ethylene oxide, at a temperature of 75° to 85° C. in a suitable stirred autoclave, it being expedient not to exceed a maximum reaction pressure of 3 bar. Additionally, for salt formation, reaction is carried out with an equivalent amount (corresponding to the number of nitrogen atoms) of one of the carboxylic acids or mineral acids on which the anions $A^-$ defined above are based. Examples of carboxylic acids are acetic acid, propionic acid, or acids, which optionally also carry 1 to 3 hydroxyl groups, such as glycolic acid and lactic acid. The carboxylic acid can also be an—optionally OH-substituted—dicarboxylic or tricarboxylic acid, such as succinic acid, malonic acid, maleic acid, fumaric acid, malic acid, tartaric acid or citric acid, or benzoic acid or salicylic acid. Finally, a suitable mineral acid is phosphoric acid. Lactic acid, tartaric acid and phosphoric acid are preferred. The degree of quaternization is determined by two-phase titration of the quaternary product of the formula I with sodium dodecylsulfate at pH 1 to 2 and pH 10.

Particularly in their demulsifying action, the products according to the invention are superior to the conventional cationic emulsifiers. They are compared in Tables II to IV with a conventional cationic demulsifier according to German Auslegeschrift 2,238,995 and they exhibit the unambiguously better emulsion breaking action. The comparison example Z is a quaternary product formed from 2 moles of stearylamine, condensed with ethylene oxide (containing 10 units) and p-xylylene dichloride. Table V demonstrates the better anticorrosion action of the compounds according to the invention compared with the conventional compounds of similar type in comparison example Z.

The invention is illustrated in greater detail by means of the following examples:

EXAMPLE 1

(a) Preparation of a polycondensation product from adipic acid, hexane-1,6-diol and a stearylamine which has been subjected to a condensation reaction with 15 moles of ethylene oxide:

451 g (0.5 mol) of a stearylamine which has been subjected to a condensation reaction with 15 mol of ethylene oxide, 59.1 g (0.5 mol) of hexane-1,6-diol, 100.5 g (0.85 mol) of adipic acid and 1.5 g of 50% strength by weight hypophosphorous acid are initially placed in a 1 liter reaction flask equipped with a water separator, a gas inlet tube and heating, the mixture is raised to a temperature of 160° C. under a nitrogen atmosphere and the esterification reaction is continued at this temperature with continuous separation of water.

After a reaction time of 20 hours, the condensation reaction is found to be virtually complete by determining the acid number and the amine number.

(b) Quaternizing the resulting polycondensate with a carboxylic acid and an alkylene oxide:

301 g (0.25 mol, calculated on the recurring unit) of the polycondensate obtained in accordance with Example 1 a) are neutralized with 31 g (0.25 mol) of 70% strength by weight lactic acid in the presence of 18 g (1 mol) of water and 20 g of isobutanol, and are quaternized with 55.1 g (1.25 mol) of ethylene oxide. The reaction is complete in 12 hours at a temperature of 80° to 85° C. and a maximum pressure of 2.6 bar. A liquid which is clear at room temperature is formed. The degree of quaternization of the quaternary polytercondensation product is determined from the ratio of the acid two-phase titration to the alkaline two-phase titration with sodium dodecylsulfate, and is 93%.

The compounds of the formula I indicated in Table I below, Examples 2 to 35, are also reacted under the reaction conditions described in Example 1, and the degrees of quaternization listed are obtained:

TABLE I

| Example | Dicarboxylic acid component Amount (g)/molar ratio | Amine oxalkylate component | Diol component | Anion | Degree of quaternization (%) |
|---|---|---|---|---|---|
| 2 | Adipic acid 64.6/0.85 | A 90.5/0.5 | N 460.2/0.5 | Lactic acid | 37 |
| 3 | Adipic acid 199/0.85 | A 278/0.5 | P 258/0.5 | Lactic acid | 55 |
| 4 | Adipic acid 49.7/0.85 | A 69.5/0.5 | O 631.7/0.5 | Lactic acid | 13 |
| 5 | Adipic acid 218.5/0.833 | A 315/0.5 | R 106.4/0.5 | Lactic acid | 67 |
| 6 | Adipic acid 121.7/0.83 | A 174.8/0.5 | Q 201.1/0.5 | Lactic acid | 55 |
| 7 | Adipic acid 91.3/0.833 | B 233.4/0.8 | Q 60.0/0.2 | Lactic acid | 76 |
| 8 | Adipic acid 39.3/0.83 | C 68.3/0.5 | N 274.2/0.5 | Lactic acid | 48 |
| 9 | Adipic acid 62.1/0.85 | D 148.4/0.5 | N 442.5/0.5 | Lactic acid | 60 |
| 10 | Adipic acid 82.7/0.85 | D 290.4/0.75 | O 433.1/0.25 | Lactic acid | 71 |
| 11 | Adipic acid 41.4/0.85 | D 48.4/0.25 | O 652.2/0.75 | Lactic acid | 22 |
| 12 | Adipic acid 121.7/0.83 | E 271.0/0.5 | Q 201/0.5 | Lactic acid | 90 |
| 13 | Adipic acid 124.3/0.85 | F 451/0.5 | Q 197/0.5 | Lactic acid | 81 |
| 14 | Adipic acid 49.7/0.85 | F 354/0.5 | N 180.4/0.5 | Lactic acid | 72 |
| 15 | Adipic acid 37.2/0.85 | F 135.3/0.5 | O 379/0.5 | Lactic acid | 61 |
| 16 | Adipic acid 100.5/0.85 | F 451/0.5 | R 59.1/0.5 | Lactic acid | 93 |
| 17 | Adipic acid 124.3/0.85 | F 450.9/0.5 | P 161.2/0.5 | Lactic acid | 71 |
| 18 | Adipic acid 174/0.85 | G 522.6/0.5 | R 82.7/0.5 | Lactic acid | 84 |
| 19 | Adipic acid 124.3/0.85 | G 373.3/0.5 | P 161.2/0.5 | Lactic acid | 77 |
| 20 | Adipic acid 124.3/0.85 | G 374/0.5 | Q 197/0.5 | Lactic acid | 82 |
| 21 | Adipic acid 248.5/0.85 | H 377.8/0.5 | R 118.2/0.5 | Lactic acid | 72 |
| 22 | Adipic acid 194.9/0.85 | H 302.2/0.5 | P 257.9/0.5 | Lactic acid | 61 |
| 23 | Adipic acid 161.6/0.85 | H 245.6/0.5 | Q 156.1/0.5 | Lactic acid | 64 |

TABLE I-continued

| Example | Dicarboxylic acid component Amount (g)/molar ratio | Amine oxalkylate component Amount (g)/molar ratio | Diol component Amount (g)/molar ratio | Anion | Degree of quaternization (%) |
|---|---|---|---|---|---|
| 24 | Adipic acid 174.0/0.85 | I 451.5/0.5 | Q 276.0/0.5 | Lactic acid | 81 |
| 25 | Adipic acid 149.1/0.85 | I 386.9/0.5 | P 193.4/0.5 | Lactic acid | 82 |
| 26 | Adipic acid 161.6/0.83 | I 454.6/0.5 | R 76.8/0.5 | Lactic acid | 83 |
| 27 | Adipic acid 82.7/0.85 | J 145.7/0.75 | O 433.1/0.25 | Lactic acid | 47 |
| 28 | Adipic acid 49.7/0.85 | J 29.1/0.75 | O 782.7/0.75 | Lactic acid | not determined |
| 29 | Adipic acid 36.6/0.83 | M 82.9/0.5 | O 377.4/0.5 | Lactic acid | 55 |
| 30 | Adipic acid 48.5/0.83 | K 70.3/0.5 | O 521.8/0.5 | Lactic acid | 55 |
| 31 | Adipic acid 121.7/0.833 | K 175.9/0.5 | Q 201/0.5 | Lactic acid | 74 |
| 32 | Adipic acid 99.3/0.85 | K 211/0.75 | N 340/0.25 | Lactic acid | 56 |
| 33 | Adipic acid 74.5/0.85 | K 158.3/0.75 | O 391.4/0.25 | Lactic acid | 62 |
| 34 | Adipic acid 74.5/0.85 | L 238.1/0.75 | O 391.3/0.25 | Lactic acid | 74 |
| 35 | Adipic acid 41.4/0.85 | L 44.1/0.25 | O 652.2/0.75 | Lactic acid | 26 |

The abbreviations used in Table I have the following meaning:
A = stearylamine, condensed with 2 moles of ethylene oxide
B = stearylamine, condensed with 3 moles of ethylene oxide
C = stearylamine, condensed with 5 moles of ethylene oxide
D = stearylamine, condensed with 8 moles of ethylene oxide
E = stearylamine, condensed with 10 moles of ethylene oxide
F = stearylamine, condensed with 15 moles of ethylene oxide
G = oleylamine, condensed with 12 moles of ethylene oxide
H = tallow fat alkylamine, condensed with 2 moles of ethylene oxide
I = tallow fat alkylamine, condensed with 10 moles of ethylene oxide
J = coconut oil alkylamine, condensed with 2 moles of ethylene oxide
K = coconut oil alkylamine, condensed with 5 moles of ethylene oxide
L = coconut oil alkylamine, condensed with 10 moles of ethylene oxide
M = coconut oil alkylamine, condensed with 2 moles of ethylene oxide and 5 moles of propylene oxide
N = block polymer formed from 32 moles of propylene oxide and 4 moles of ethylene oxide
O = block polymer formed from 32 moles of propylene oxide and 28 moles of ethylene oxide
P = polypropylene glycol, molecular weight 400
Q = polyethylene glycol, molecular weight 400
R = hexane-1,6-diol

TABLE II

| Origin of crude oil emulsion: | Borneo |
| Water content of crude oil emulsion: | 18% by volume |
| Demulsification temperature: | 42° C. |
| Amount metered in: | 80 ppm |

| Emulsion breaker type from Example | Separation of water in % by volume after ... minutes | | | | | | Residual water content, % by volume, in the oil phase |
|---|---|---|---|---|---|---|---|
| | 10 | 20 | 30 | 60 | 120 | 180 | |
| 3 | 31 | 75 | 95 | 99 | 100 | 100 | 0.07 |
| 5 | 76 | 86 | 93 | 97 | 100 | 100 | 0.08 |
| 23 | 43 | 71 | 82 | 88 | 94 | 95 | 0.14 |
| Z | 22 | 44 | 55 | 61 | 64 | 67 | 0.85 |
| Blank value | 0 | 0 | 0 | 0 | 0 | 0 | 4.25 |

TABLE III

| | | | | | | | | |
|---|---|---|---|---|---|---|---|---|
| Origin of crude oil emulsion: | | | | | Emsland (West Germany) | | | |
| Water content of crude oil emulsion: | | | | | 66% by volume | | | |
| Salt content of crude oil emulsion: | | | | | 11.48% by weight | | | |
| Demulsification temperature: | | | | | 55° C. | | | |
| Amount metered in: | | | | | 35 ppm | | | |

| Emulsion breaker type from Example | Separation of water in % by volume after ... hours | | | | | | Residual salt content, % by weight, in the oil phase |
|---|---|---|---|---|---|---|---|
| | 1 | 3 | 6 | 9 | 12 | 18 | 24 | |
| 11 | 60 | 70 | 78 | 87 | 96 | 99 | 100 | 0.04 |
| 15 | 31 | 44 | 60 | 75 | 91 | 98 | 99 | 0.07 |
| 27 | 49 | 61 | 71 | 78 | 88 | 95 | 100 | 0.04 |
| 28 | 66 | 78 | 86 | 93 | 98 | 100 | 100 | 0.01 |
| 30 | 8 | 26 | 47 | 75 | 83 | 97 | 100 | 0.03 |
| Z | 24 | 34 | 44 | 51 | 56 | 58 | 60 | 2.76 |
| Blank value | 0 | 0 | 0 | 0 | 0 | 0 | 0 | 6.26 |

TABLE IV

| | | | | | | |
|---|---|---|---|---|---|---|
| Origin of crude oil emulsion: | | | | | Venezuela | |
| Water content of crude oil emulsion: | | | | | 32% by volume | |
| Demulsification temperature: | | | | | 85° C. | |
| Amount metered in: | | | | | 48 ppm | |

| Emulsion breaker type from Example | Separation of water in % by volume after ... minutes | | | | | | Residual water content, % by volume, in the oil phase |
|---|---|---|---|---|---|---|---|
| | 10 | 20 | 30 | 40 | 50 | 60 | |
| 10 | 41 | 64 | 83 | 96 | 100 | 100 | 0.26 |
| 27 | 56 | 58 | 60 | 85 | 95 | 100 | 0.46 |
| 29 | 64 | 77 | 86 | 94 | 98 | 99 | 0.64 |
| 30 | 81 | 87 | 93 | 96 | 100 | 100 | 0.34 |
| 34 | 90 | 94 | 96 | 99 | 100 | 100 | 0.18 |
| Z | 49 | 54 | 58 | 60 | 63 | 65 | 1.18 |
| Blank value | 0 | 0 | 0 | 0 | 0 | 0 | 9.24 |

Corrosion-inhibiting action

The inhibiting action of some of the compounds according to the invention is determined by means of the loss in weight of carbon steel test coupons having a surface area of 20 cm². These are immersed for 6 hours in water at 60° C. containing 20% of sodium chloride. Throughout the duration of the test a stream of carbon dioxide bubbles through the solution, which is stirred continuously. The inhibition is quoted in %, the blank value without inhibitor, as a reference value, being 0% (this corresponds to 100% loss in weight).

TABLE V

| Product from Example | Amount employed | |
|---|---|---|
| | 10 ppm | 60 ppm |
| | % inhibition | |
| 3 | 88.1 | 88.8 |
| 10 | 90.0 | 93.7 |
| 19 | 84.1 | 86.3 |
| 20 | 82.7 | 83.9 |
| 34 | 82.8 | 89.7 |

We claim:

1. A quaternary oxalkylated polycondensate of the formula

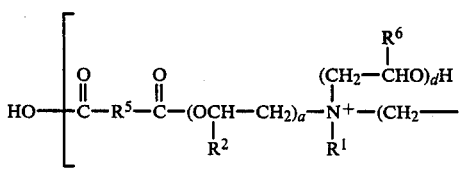

(I)

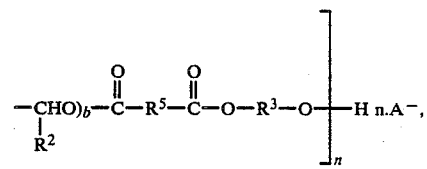

in which
R¹ is an alkyl radical or alkenyl radical having 8 to 23 carbon atoms,
R² is H or CH₃ and, arranged in blocks within the chain of the polyoxalkylene radical, can also assume both meanings,
R³ denotes an alkylene radical of formula $-(CH_2)_x-$ in which x is an integer from 1 to 6 or denotes a polyoxalkylene radical of the formula

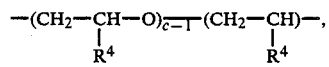

in which R⁴ is H or CH₃ and, arranged statistically or in blocks within the chain, can also assume both meanings, and c is an integer or fractional number from 2 to 80,
R⁵ is an alkylene radical of the formula $-(CH_2)_y-$ in which y denotes an integer from 1 to 8, it being possible for this alkylene radical optionally to carry 1 to 2 OH groups, or R⁵ is a vinylene radical or a p-phenylene radical,
R⁶ is H or CH₃,
A⁻ denotes the anion of a carboxylic acid having 2 to 6 carbon atoms or of a hydroxycarboxylic acid having 2 to 6 carbon atoms and 1 to 3 OH groups or denotes the anion of benzoic acid, salicylic acid or phosphoric acid,
a and b are identical or different and are an integer or fractional number from 1 to 15,
d is an integer or fractional number from 1 to 2 and n is an integer of from 2 to 50.

2. A quaternary oxalkylated polycondensate as claimed in claim 1, wherein R¹ is an alkyl radical having 12 to 18 carbon atoms.

3. A quaternary oxalkylated polycondensate as claimed in claim 1, wherein R² is H and a and b are identical or different and are an integer or a fractional number from 1 to 8.

4. A quaternary oxalkylated polycondensate as claimed in claim 1, wherein R³ is the radical of a block copolymer composed of at least one block of ethylene oxide units and at least one block of propylene oxide units, the total number of ethylene oxide units being an integer or fractional number from 15 to 35, the total number of propylene oxide units being an integer or fractional number from 20 to 40 and the sum of the two being not more than 60.

5. A quaternary oxalkylated polycondensate as claimed in claim 1, wherein $R^5$ is an alkylene radical of the formula $-(CH_2)_y-$ in which y denotes an integer from 1 to 8.

6. A quaternary oxalkylated polycondensate as claimed in claim 1, wherein $R^6$ is H.

7. A quaternary oxalkylated polycondensate as claimed in claim 1, wherein n is an integer of from 2 to 20.

* * * * *